United States Patent [19]
Coté et al.

[11] Patent Number: 5,479,548
[45] Date of Patent: Dec. 26, 1995

[54] FIBER-OPTIC COUPLER PACKAGE

[75] Inventors: Robert E. Coté, Phoenix; Hermen C. Aranda, Peoria; Karl A. Fetting, Glendale; Clinton J. Hungerford; David M. Hurst, both of Phoenix; John H. Shannon, Scottsdale, all of Ariz.

[73] Assignee: Honeywell Inc., Minneapolis, Minn.

[21] Appl. No.: 250,136

[22] Filed: May 27, 1994

[51] Int. Cl.⁶ .................................................. G02B 6/245
[52] U.S. Cl. .................. 385/51; 385/43; 385/99
[58] Field of Search .................................. 385/39, 42, 43, 385/46, 48, 50, 51, 70, 95, 99, 134, 136, 137

[56] References Cited

U.S. PATENT DOCUMENTS

| | | | |
|---|---|---|---|
| 4,593,968 | 6/1986 | Giallorenzi | 385/51 |
| 4,714,316 | 12/1987 | Moore et al. | 385/137 |
| 4,729,619 | 3/1988 | Blomgren | 385/70 |
| 4,822,127 | 4/1989 | Kamiya et al. | 385/46 |
| 4,906,068 | 3/1990 | Olson et al. | 385/43 |
| 4,992,122 | 2/1991 | Rayit | 156/158 |
| 5,148,508 | 9/1992 | Anjan et al. | 385/51 |
| 5,240,489 | 8/1993 | Robson | 65/409 |
| 5,251,276 | 10/1993 | Berkey et al. | 385/43 |
| 5,261,018 | 11/1993 | Suganuma et al. | 385/51 |
| 5,263,104 | 11/1993 | Anjan et al. | 385/51 |
| 5,293,440 | 3/1994 | Miles et al. | 385/51 |
| 5,295,219 | 3/1994 | Koya et al. | 385/134 |

FOREIGN PATENT DOCUMENTS

| | | | |
|---|---|---|---|
| 55-98701 | 7/1980 | Japan | 385/51 |
| 63-316008 | 12/1988 | Japan | 385/51 |
| 2217473 | 10/1989 | United Kingdom . | |

OTHER PUBLICATIONS

Epoxy Technology, Inc., EPO–TEK 354 Data Sheet, 1 page, Feb. 1993.
Dow Corning Corp., Q3–6575 Silicone Dielectric Gel; Data Sheet, 2 pages, 1984.

*Primary Examiner*—John D. Lee
*Attorney, Agent, or Firm*—Brian C. Downs; Ronald E. Champion

[57] ABSTRACT

A housing for fiber optic components reduces stress on optical fibers and protects the components from environmental shock and vibration. The housing includes a protective body having a receiving space wherein the fiber optic component is positioned. A rigid adhesive applied to the fibers in a specific stress reducing profile near the ends of the receiving space secures the component out of contact with the wall of the receiving space without inducing stress on the jacketless optical fibers. A gel support material fills the receiving space surrounding the component and providing vibration isolation. The invention is particularly uses for housing fiber optic couplers which are subject to shock, vibration, and temperature extremes.

23 Claims, 3 Drawing Sheets

FIBER-OPTIC COUPLER PACKAGE

BACKGROUND OF THE INVENTION

The present invention relates generally to housings for fiber optic components and, more specifically to housings for fiber optic couplers.

Optical fibers are thin transparent fibers of glass or plastic enclosed by material(or cladding) having a lower index of refraction and transmit light throughout their length by internal reflections. The fibers and cladding are typically enclosed in a protective polymer jacket.

Fiber optic couplers connect one or more optical fibers together allowing electromagnetic waves to propagate through the connected optical fibers. Such couplers are used in fiber optical communications systems, optical sensors, fiber optic gyros, and many other devices.

One type of fiber optic coupler is fabricated by fusing and tapering two or more optical fibers together. The fibers or both the fibers and cladding are brought together, and heated to fuse and taper the fibers (and cladding) resulting in a fused and tapered region for coupling of optical power.

Fiber optic couplers are extremely fragile and must be protected from most environmental conditions. FIG. 1 shows a cutaway view of prior art housings for optical couplers.

The housing 10 encloses the fiber optic coupler 11. Coupler 11 couples optical power between optical fibers 12. Optical fibers 12 have a jacketed portion 12A and a jacketless portion 12B. The protective jacket is removed from the area of the fiber optic coupler 11 prior to biasing the optical fibers together. Coupler 11 is enclosed in protective body 13 which is formed from a glass tube. Slot 13A is cut in protective body 13 providing access into the interior receiving space 13B. The protective body 13 is encased in a cylindrical stainless steel tube 14 for added protection. Adhesive 15 is applied near each end of protective body 13 securing jacketed portions 12A to the interior of protective body 13 and suspending complete 11 away from the interior walls of protective body 13. Finally, a silicon material (not shown) fills the receiving space 13B surrounding coupler 11. The silicon material cures into a resilient solid which supports coupler 11 and dampens vibrations and shock imparted to housing 10.

FIG. 2 is a cross sectional view of the prior art along view 2—2 of FIG. 1. Jacketless optical fibers 12B are suspended in receiving space 13B and surrounded by silicon support material 20. Glass protective body 13 is encased by stainless steel tube 14. The thin wall glass tubing used in the prior art is susceptible to fracturing as indicated by arrows 21, due to repeated temperature cycles. It is believed that fracturing of the protective body directly leads to damage or failure of the enclosed optical component.

Several factors make fabricating a robust protective housing for optical components difficult. Three factors which must be considered when designing a housing include stress, vibration and shock, and refraction.

First, stress on the optical fibers and fiber optic components must be reduced or eliminated. Acute stress causes the fibers to break while lesser stress causes the optical properties of the fiber to change and degrade resulting in inefficient propagation of optical power. Stress is caused by pulling, bending, or otherwise applying force on an optical fiber.

One cause of stress is the result of thermal expansion and contraction of the fibers and the housing. When the housing and the fibers expand and contract at different rates, stress is induced in the optical fibers. The prior art reduced this problem by making protective body 13 out of glass which has the same thermal coefficient of expansion as the fibers so that both the protective body and the fibers expand and contract at the same rate. This reduces the expansion problem, however, adhesives 15 which secure the optical fibers in the protective body do not have the same coefficient of expansion as the optical fibers and impart stress to jacketless optical fibers. Also, these adhesives do not adhere well to either the jacketed or non-jacketed portions of the optical fibers. The prior art is careful to avoid this stress on the jacketless optical fibers by applying adhesive only to jacketed portions 12A of the optical fibers. As a consequence, the bare or jacketless optical fibers are subject to movement or sliding inside the protective jacket material which causes stress on the optical fibers and components.

Second, the fiber optic component must be protected from vibration and shock. The prior art uses a glass protective body to shield the component From vibration and shock. Adhesives are used to suspend the component in the protective body and away from the walls of the protective body providing further isolation from vibration and shock. As discussed above, however, adhesives impart stress to jacketless optical fiber because of the differing expansion characteristics of the adhesive and the optical fibers. Finally, the prior art surrounds the fiber optic component with a resilient silicon material to support and isolate the component from vibration and shock. Overtime, however, this resilient material hardens, shrinks, and separates from the walls of the protective body thus eliminating its effectiveness and inducing acute stress on the component.

Third, any type of housing or protection must not interfere with the optical transmission characteristics of the component or the optical fiber. Typically this requires that materials in contact with the optical fibers have a lower index of refraction than the optical fibers. This requirement severely limits the design of and materials used to construct housings for fiber optic components.

Clearly there is a need for an improved housing for fiber optic components and the like which provides improved stress, vibration, and shock protection over a wide temperature range.

SUMMARY OF THE INVENTION

The invention creates a housing for fiber optic components which protects the components from adverse environmental conditions. The housing includes a protective body comprising a glass rod having a receiving space cut into the rod for receiving a fiber optic component. A rigid adhesive is applied to the jacketless optical fibers in a specific stress reducing profile near each end of the receiving space and secures the component in the receiving space but out of contact with the walls of the receiving space. Gelatinous support material fills the receiving space and surrounds the component providing improved vibration isolation. The invention is particularly useful for housing a fiber optic coupler which is subject to stress, vibration, shock, and temperature extremes.

The housing is preferably formed from a solid fused silica or fused quartz rod. A channel is cut in the glass rod forming a receiving space for a fiber optic component. The adhesive secures the optical fibers in the receiving space and suspends the component out of contact with the walls of the receiving space. The adhesive is applied in a specific profile which permits adhesive to be applied directly to jacketless optical fibers without inducing stress. The specific stress reducing profile partially surrounds the jacketless optical fibers and completely surrounds the jacketed portion of the optical fibers. This adhesive profile prevents the jacketless optical fibers from moving or sliding relative to the protective jackets resulting in a more reliable protective housing than the prior art.

Support material fills the remainder of the receiving space and surrounds the optical component. The support material is a gel which retains its gel state through a wide temperature range and for an indefinite period of time (several years). The support material adheres to both the protective body and to the jacketless optical fibers. This new support material provides improved vibration isolation over the prior art and eliminates the shrinkage and separation problems of the prior art.

The significant features of the invention are illustrated in the figures and described more fully below.

DESCRIPTION OF THE PREFERRED EMBODIMENT

Figure 3:
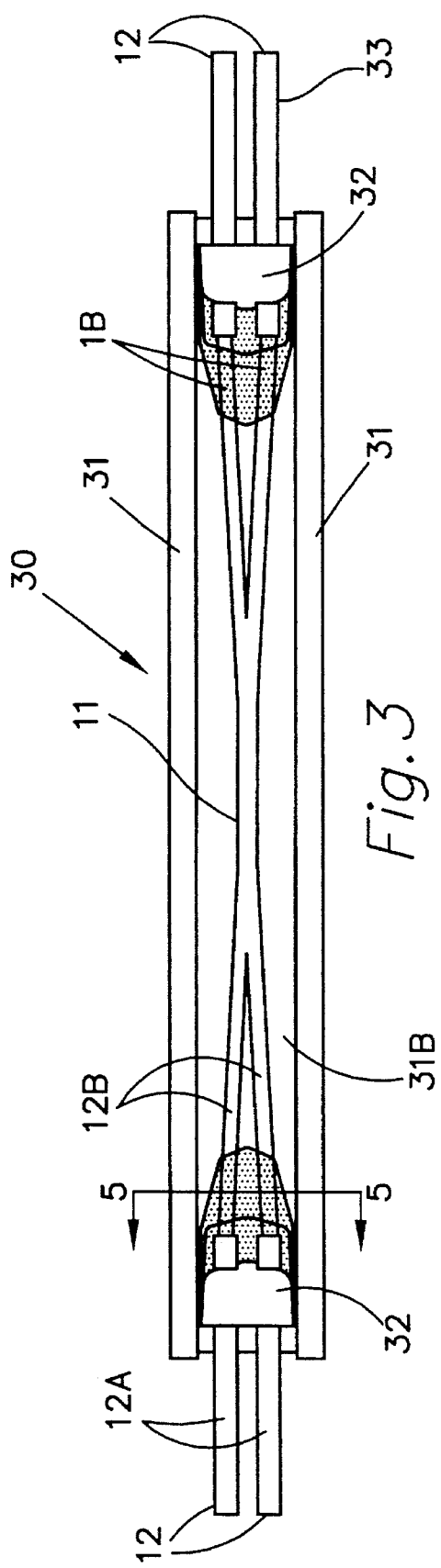
FIG. 3 is top cutaway view of the invention.

FIG. 3 is a top cutaway view of the invention. Housing 30 is comprised of protective body 31 having a receiving space 31B, suspension adhesive 32, and support material (not shown). Housing 30 encloses fiber optic coupler 11 and portions of optical fibers 12.

Protective body 31 is preferably fabricated from a fused silica rod having a diameter generally between 0.09 and 0.10 inches. Protective body 31 is cut using a diamond saw to form receiving space 31B. Receiving space 31B is approximately 0.030 inches in width and runs the length of protective body 31. The resulting protective body 31 generally ranges in length between 1.235 and 1.265 inches.

Adhesive 32 is positioned near each end of protective body 31. Adhesive 32 secures optical fibers 12 in receiving space 31B and suspends optical coupler 11 away from the walls of receiving space 31B.

Adhesive 32 is applied in a specific profile which reduces stress on jacketless portions 12B of optical fibers 12. The significant feature of the specific profile is that adhesive 32 does not surround the jacketless portions 12B of optical fibers 12. Because adhesive 32 does not completely surround the jacketless portions 12B, stress due to differing coefficients of expansion between adhesive 32 and optical fibers 12 is significantly reduced. Consequently, the invention allows jacketless or bare optical fibers to be secured by adhesive, a technique not previously known.

In the preferred embodiment. additional amounts of adhesive 32 are applied to surround the jacketed portion 12A of optical fibers 12 and securely attach the fibers in receiving space 31B. Stress is not induced in the jacketed optical fibers because they are protected by the resilient jacket material 33.

Adhesive 32 is applied in the following manner. First, a small amount of adhesive is applied to the bottom of the optical fibers 12. Next, the optical fibers 12 and optic coupler 11 are lowered into the receiving space 31B where adhesive 32 contacts the wall of the receiving space 31B. An adequately small amount of adhesive 32 is chosen so that excess adhesive does not surround the jacketless portion 12B of optical fibers 12, but sufficient adhesive is chosen such that optical fibers 12 and optical coupler 11 are suspended away from the walls of receiving space 31B.

Finally, an additional portion of adhesive 32 is applied to the top of the jacketed portion 12A so that adhesive 32 surrounds the jacketed portions 12A and securely holds the optical fibers 12 in receiving space 31A.

Several epoxy adhesives are suitable for use in the invention. The preferred embodiment uses "EPO-TEK"® 354-T high temperature epoxy which has characteristics particularly suited for fiber optics. "EPO-TEK"®354-T is available from Epoxy Technology Inc., Billerica, Mass. "EPO-TEK"®354-T is a highly viscous version of "EPO-TEK"®354. "EPO-TEK"®354-T has good adhesion to glass and acrylic fiber jacket material and has a lower thermal expansion than previous adhesives used for this purpose. "EPO-TEK" 354 has a coefficient of thermal expansion of about $49\times10^{-6}$ in/in/deg. C. below the glass transition temperature and about $165\times10^{-6}$ in/in/deg. C. above the glass transition temperature. Once in place, the adhesive is thermally cured forming a rigid suspension material.

Figure 4:
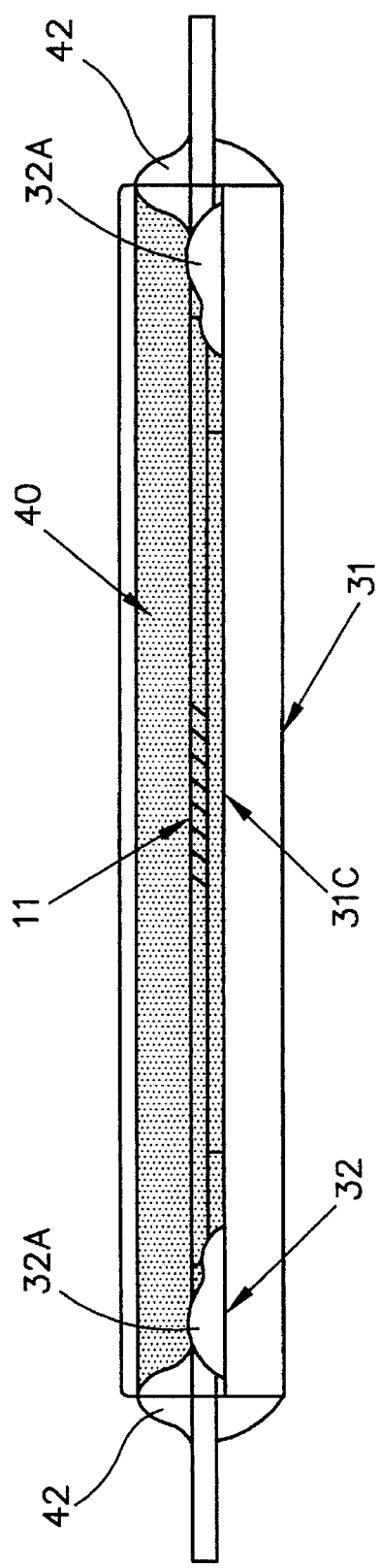
FIG. 4 is a side cutaway view of the invention.

FIG. 4 is a side cutaway view of the invention. Shown in FIG. 4 is the stress reducing profile of adhesive 32, the suspension of the optic coupler 11 above the wall 31C of receiving space 31B, and gelatinous support material 40.

The raised portion 32A of adhesive 32 covers and surrounds the jacketed portion 12A of optical fibers 12. Adhesive 32 tapers down as it approaches the jacketless portion 12B so that none of the jacketless portion 12B is surrounded by adhesive 32. Adhesive 32 is applied in sufficient quantity to suspend optical fibers 12 and coupler 11 away from the wall 31C of receiving space 31B. The remainder of receiving space 31B is filled with gelatinous support material 40. Support material 40 completely surrounds optical coupler 11 and provides increased shock and vibration isolation.

Several characteristics of support material 40 are significant. First, support material 40 is a gel. The prior art taught the use of silicon support material that cured into a resilient solid. It has been found that a gel type material provides improved vibration isolation over the resilient solids of the prior art and does not deteriorate over time. The preferred embodiment uses DOW CORNING®Q3-6575 Silicone Dielectric Gel as the support material. Q3-6575 remains a gel in the range of –80° C. to 200° C. and remains a gel even with aging. Q3-6575 also acts as a pressure sensitive adhesive and adheres to both the protective body 31, the optical fibers 12, and optical coupler 11.

Each end of protective body 31 is sealed with a room temperature vulcanization(RTV) material 42. RTV materials are commonly known in the art.

Figure 1:
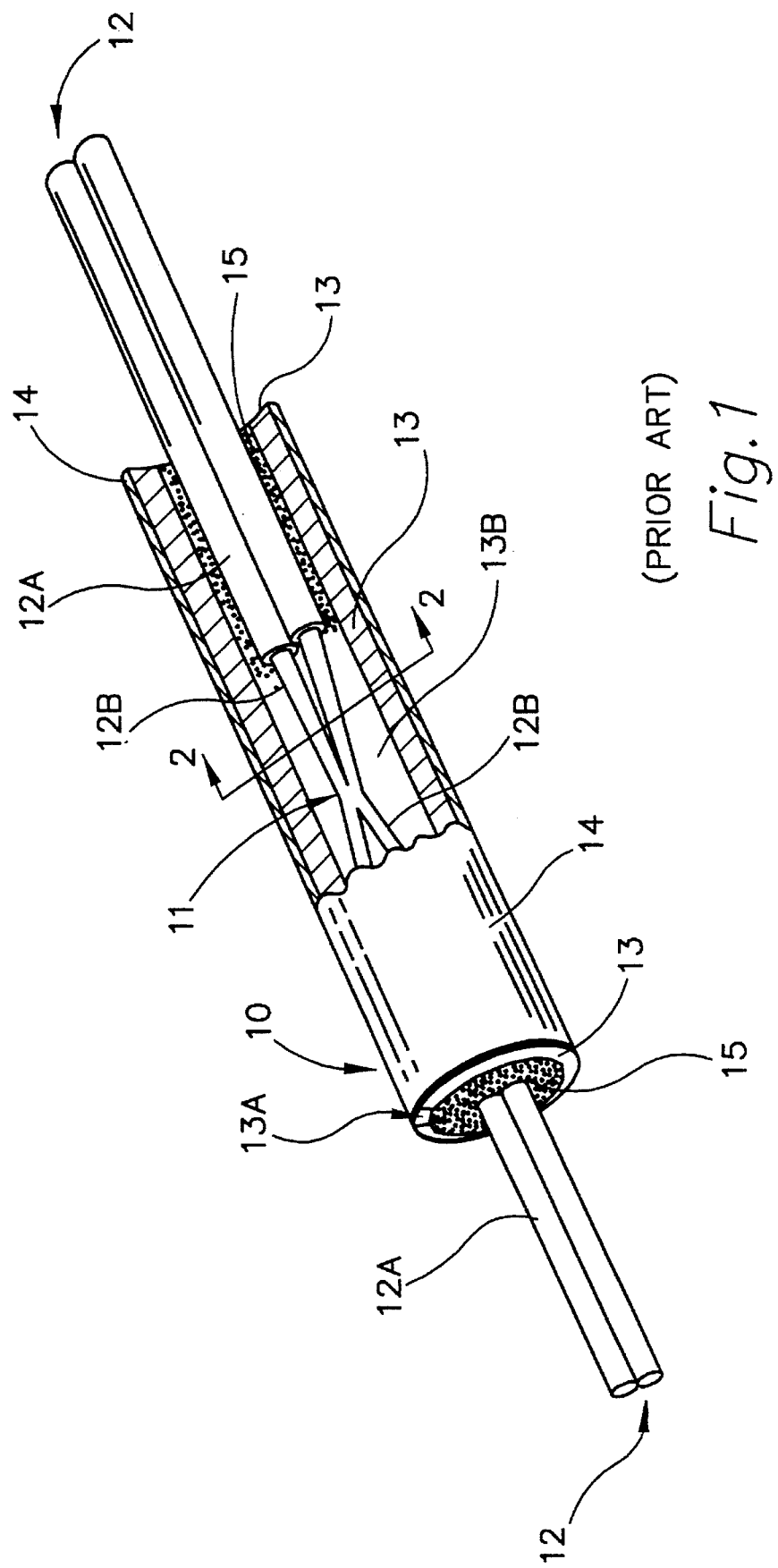
FIG. 1 shows a perspective cutaway view of the prior art.
Figure 2:
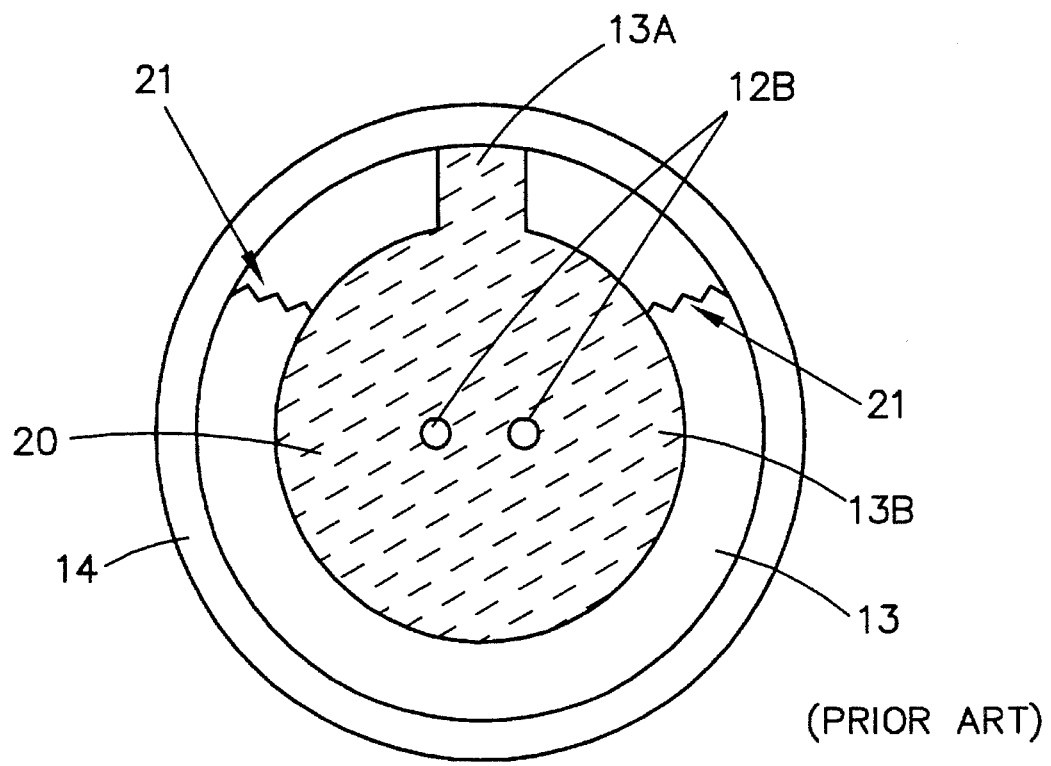
FIG. 2 is a cross section view of the prior art.
Figure 5:
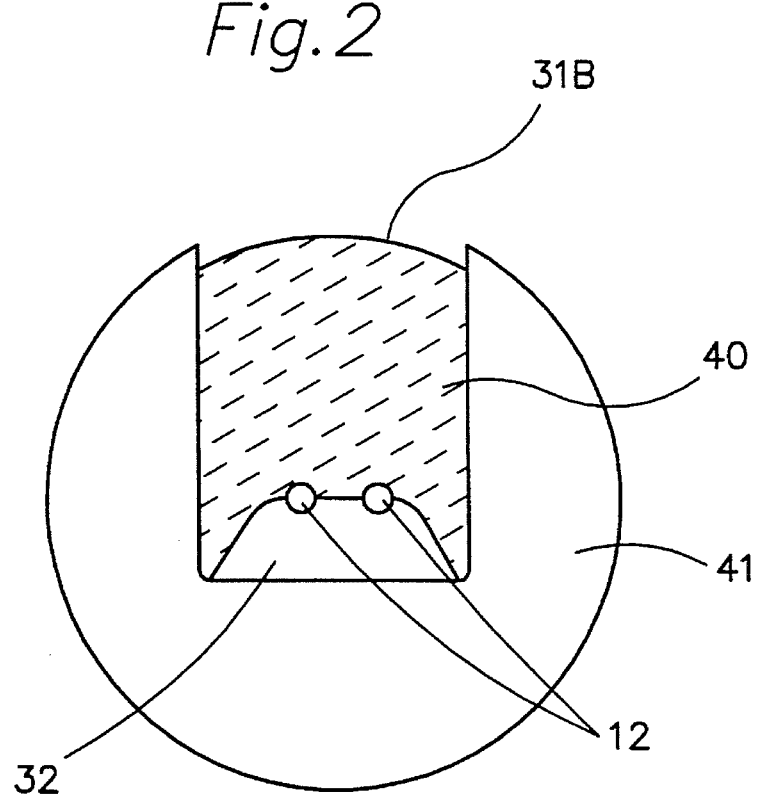
FIG. 5 is a cross section view of the invention.

FIG. 5 is a cross section along view 5—5 in FIG. 3.

Protective body 31 has a receiving space 31B formed therein. Since protective body 1 is fabricated from a solid glass rod, it is significantly stronger than the thin glass tubing of the prior art.

Adhesive 32 secures jacketless optical fibers 12B to the wall 31C of receiving space 31B in a stress reducing profile. Adhesive 32 partially surrounds optical fibers 12. Using this profile, the jacketless optical fibers are held secure in a manner previously unknown in the art.

This detailed description of the invention is intended for descriptive purposes only and is not intended to limit the scope of the invention. Although this description has described the invention as housing a fiber optic coupler, those skilled in the art readily recognize that the invention is useful in many applications. For example, fragile components other than fiber optic couplers may be protected by the invention.

It is clear from the foregoing that the present invention represents a new and useful device for protecting fiber optic components and the like.

The embodiments of an invention in which an exclusive property or right is claimed are defined as follows:

1. A housing for a fiber optic coupler connecting at least two optical fibers together for coupling optical power between said optical fibers, said optical fibers having a jacketless portion, said optical fibers extending beyond said fiber optic coupler, said housing comprising:
   a) a protective body having a receiving space, said receiving space being a channel formed in said protective body such that said optic coupler can be lowered into said receiving space, said coupler positioned in said receiving space; and,
   b) suspension adhesive for holding said at least two optical fibers in said receiving space, said suspension adhesive having a stress reducing profile where it contacts the jacketless portion of said optical fibers.

2. The housing for a fiber optic coupler according to claim 1 wherein said stress reducing profile includes said suspension adhesive applied only to the bottom of said jacketless portion of said optical fibers.

3. The housing for an optical fiber coupler according to claim 2 wherein said suspension adhesive is a thermally cured epoxy adhesive having a coefficient of thermal expansion of about $49 \times 10^{-6}$ in/in/deg. C below the glass transition temperature and about $165 \times 10^{-6}$ in/in/deg. C above the glass transition temperature, is sufficiently viscous to suspend said fiber optic coupler away from the wall of said receiving space and available under the trademark name "EPO-TEK 354T".

4. The housing for a fiber optic coupler according to claim 1 further comprising a support material located in said receiving space and at least partially surrounding said coupler, said support material being a gel.

5. The housing for an optical fiber coupler according to claim 4 wherein said support material remains a gel from $-80°$ C. to $200°$ C.

6. The housing for an optical fiber coupler according to claim 5 wherein said support material is a silicone gel which remains a gel for at least one year in the temperature range from $-80°$ C. to $200°$ C.

7. The housing for an optical fiber coupler according to claim 6 wherein said support material forms a pressure sensitive adhesive bond to said protective body and to said optical fibers.

8. The housing for an optical fiber coupler according to claim 1 wherein said suspension adhesive is applied in sufficient quantity to support said fiber optic coupler a sufficient distance from the wall of said receiving space to provide vibration isolation.

9. A housing for at least one fiber optic component, said fiber optic component having at least one attached optical fiber, said housing comprising:
   a) a protective body having a receiving space for containing said fiber optic component;
   b) suspension means for securing said fiber optic component in said receiving space; and,
   c) support means, at least partially surrounding said fiber optic component, for isolating said fiber optic component from vibration and shock, said support means being a gel.

10. The housing according to claim 9 wherein said suspension means is an adhesive having a stress reducing profile.

11. The housing according to claim 10 wherein said suspension means partially surrounds a jacketless portion of said optical fibers.

12. The housing according to claim 11 wherein said suspension means is a thermally cured adhesive having a coefficient of thermal expansion very close to the coefficient of thermal expansion of said fiber optic component.

13. The housing according to claim 12 wherein said suspension means is located in said receiving space near where optical fibers exit said receiving space.

14. The housing according to claim 13 wherein said suspension means surrounds a jacketed portion of said optical fibers.

15. The housing according to claim 9 wherein said support means is a material which remains a gel between $-80°$ C. and $200°$ C.

16. The housing according to claim 15 wherein said support means is a silicone gel which forms a pressure sensitive adhesive bond to said fiber optic component.

17. The housing according to claim 16 wherein said protective body is a glass rod having a channel formed lengthwise therein creating said receiving space for containing said fiber optic component.

18. A fiber optic component housing of the type having a protective body, said protective body having a receiving space for containing at least one fiber optic component having at least one attached optical fiber, said at least one optical fiber having a jacketless portion, suspension means securing said optical fiber in said receiving space, and a support material at least partially surrounding said fiber optic component, wherein the improvements comprise:
   a) said suspension means being an adhesive having a stress reducing profile where said suspension means is in contact with the jacketless portion of said optical fiber; and,
   b) said support material being a silicone gel.

19. The fiber optic component housing according to claim 18 wherein said support material forms a pressure sensitive adhesive bond to said fiber optic component and to said protective body and remains a gel between about minus $80°$ C. and about $200°$ C.

20. A method of forming a fiber optic component assembly comprising the steps of:
   a) providing a protective body having a receiving space, said receiving space representative of a channel cut into said protective body;
   b) providing at least one fiber optic component having at least one attached optical fiber, said at least one optical fiber having a top and a bottom and a jacketed portion and a jacketless portion;
   c) providing an adhesive;
   d) applying said adhesive to said bottom jacketless portion of said attached optical fiber, said adhesive applied in sufficient quantity to secure said attached optical fiber in said receiving space without surrounding said jacketless portion of said attached optical fibers;
   e) lowering said fiber optic component and said attached optical fiber into said receiving space; and,
   f) curing said adhesive.

21. The method of forming a fiber optic component assembly according to claim 20 wherein the step of applying said adhesive includes applying said adhesive in sufficient quantity to suspend said fiber optic component out of contact with said protective body.

22. The method of forming a fiber optic component assembly according to claim 21 further comprising the step of filling said receiving space with a support material which is a gel.

23. A fiber optic component housing for housing fiber optic components having at least one attached optical fiber, said housing comprising:

a) a protective body having a receiving space for containing said fiber optic component;

b) adhesive securing said at least one optical fiber in said receiving space; and, c) support means, at least partially surrounding said fiber optic component, for isolating said fiber optic component from vibration and shock, said support means being a gel.

* * * * *